United States Patent [19]

Liss

[11] Patent Number: 4,516,198
[45] Date of Patent: May 7, 1985

[54] CONTROL SYSTEM FOR DC POWER TRANSMISSION

[75] Inventor: Göte Liss, Ludvika, Sweden

[73] Assignee: ASEA Aktiebolag, Västeras, Sweden

[21] Appl. No.: 468,606

[22] Filed: Feb. 22, 1983

[30] Foreign Application Priority Data

Mar. 4, 1982 [SE] Sweden .................................. 8201341

[51] Int. Cl.³ .............................................. H02J 3/36
[52] U.S. Cl. .......................................... 363/35; 363/51
[58] Field of Search ............................... 363/34, 35, 51

[56] References Cited

U.S. PATENT DOCUMENTS 3,275,838  9/1966  Almström ............................ 363/35
3,487,286 12/1969  Persson ............................... 363/35
4,126,892 11/1978  Ekstrom et al. .................... 363/35

Primary Examiner—Peter S. Wong
Assistant Examiner—Anita M. Ault
Attorney, Agent, or Firm—Pollock, Vande Sande & Priddy

[57] ABSTRACT

In a DC power transmission system the rectifier and inverter stations are controlled by transmitting a signal representative of the voltage of the AC network in the inverter station, to the rectifier station and/or measuring the voltage in the AC network of the rectifier station and comparing it with the DC voltage on the transmission line. When the measured AC voltage exceeds the measured DC voltage, this indicates that the AC voltage of the inverter station has been reduced to such an extent that the rectifier station may receive a signal to this effect at the same time as the voltage reduction has been measured in the inverter station.

6 Claims, 1 Drawing Figure

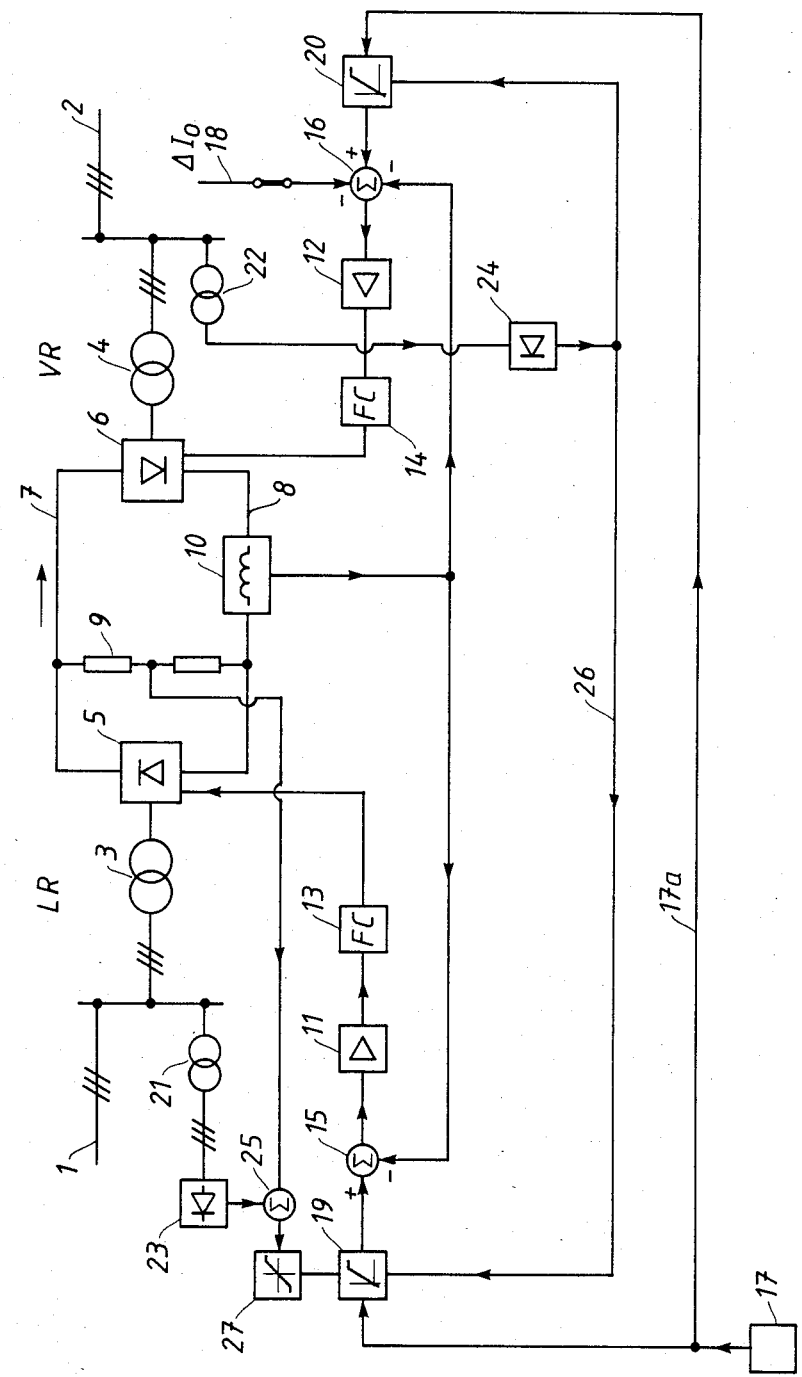

CONTROL SYSTEM FOR DC POWER TRANSMISSION

BACKGROUND OF THE INVENTION

1. Field of the Invention

The present invention relates to a control system for a DC power transmission system comprising a rectifier station, an inverter station, an AC network for each station, a DC line connecting said stations together, control means for the system comprising a current control circuit for the transmission system which delivers a common current order to a current regulator for each station, and a circuit in one of said stations for setting a current margin between the said two stations.

Such DC transmission systems are used for the asynchronous interconnection of AC networks. The networks may be located at a distance from each other, for example separated by watercourses or sparsely populated areas, or they may be located close to each other in which case the rectifier and inverter stations are usually built together. The latter case is referred to as a back-to-back connection, and is useful if it is desirable to avoid any synchronous connecting of the two networks together.

2. Description of the Prior Art

For control of a DC transmission system as described above, it is usual to control the rectifier and inverter stations from a current regulator located in each station. These current regulators are in turn, controlled by a common current order which can be derived from some other control parameter. By introducing a so-called current margin into the control system of one of the stations, the rectifier station can have a greater resulting current order than the inverter station, which results in the station with the highest voltage setting, normally the rectifier station, determining the transmitted direct current and in the other station determining the direct voltage. In this way—as is described in Uhlmann: "Power Transmission by Direct Current", Springer-Verlag, 1975, pages 128–129—stable operating conditions in the transmission are obtained.

In addition, the control principle described above offers the advantage that it is relatively simple to introduce various auxiliary parameters into the basic control system in order to increase the capability of the system and thus make allowance for variations and disturbances in the AC networks or in the DC transmission line.

Among other things, it has been found that in the event of voltage drops in the power-receiving AC network, i.e. the network of the inverter station (for example caused by short-circuits, ground faults or the like), the transmitted direct current should be reduced in order to reduce the power transmitted to this network, thus ensuring the stability of this network. Such a current reduction suitably takes place by introducing a current-order limiting circuit in each station. Such a limiting circuit is of general value to put an upper limit to the current order which dictates the transmission, for example from some superordinate control system. Said limiting circuit is then made dependent on the voltage, and since a current limitation must take place at the same time in both stations to ensure the stability of the transmission system, it is a natural thing to start from a voltage which is easily accessible in both stations, namely the DC voltage on the transmission line.

SUMMARY OF THE INVENTION

However, as mentioned above, it is the AC voltage of the inverter station that is of primary interest, and therefore, according to the invention, it is proposed to introduce into a DC power transmission system, a device for deriving or indicating the voltage in the AC network of the inverter station.

BRIEF DESCRIPTION OF DRAWING

The measurement or derivation of the AC voltage of the network in the inverter station can take place in a number of different ways, and the invention will be described in more detail with reference to the accompanying drawing which schematically shows a DC power transmission system according to the invention employing one form of improved control arrangement.

DESCRIPTION OF PREFERRED EMBODIMENTS

The drawing shows a DC power transmission system comprising a rectifier station LR and an inverter station VR, the power transmission taking place in a direction from left to right as shown in the drawing. It should, however, be pointed out that a DC transmission system normally functions in both directions, and therefore the different circuits shown in the drawing would normally be duplicated so that all circuits are present in both stations. For simplicity, however, only the equipment required where the rectifier station is on the left and the inverter station on the right is illustrated and described.

The stations LR and VR are connected to individual AC networks 1 and 2, respectively, and are provided with respective converter transformers 3, 4 and respective valve bridges 5, 6. The DC transmission line that links the stations LR and VR is shown by the busbars 7 and 8. Between the DC busbars 7, 8 a voltage divider 9 is located to obtain a measure of the DC voltage on the line, and in the lower busbar 8 there is a DC current measuring means 10, for example a measuring transductor. The stations are each controlled by a current regulator 11, 12 which control the firing circuits (FC) 13, 14 of the valve bridges 5, 6.

On the input side of each current regulator 11, 12, a respective summator 15, 16 is provided. The summators 15 and 16 each receive a signal (from the means 10) representative of the DC current flowing in the line 7, 8 and a further signal (representative of the desired current in the line 7, 8) derived from a superordinate control unit 17 in one of the stations. The signal from the superordinate control unit 17 represents the current order for the transmission system and is transmitted from the station that includes the unit 17, to the other station via a telecommunication link 17a. In addition, a current margin value is fed to the summator 16 in the inverter station by way of a line 18, so that the inverter station receives a lower resultant current order than the rectifier station. In case of a reversed power flow direction, the current margin in the inverter station is disconnected (by means of the circuit-breaker shown in the line 18) and a current margin value is fed to the summator 15 instead.

The current order from the unit 17 is supplied to the respective summators 15, 16 via current limiting circuits 19, 20. Usually such circuits are provided to ensure that the current order from the unit 17 does not exceed the capacity of the transmission system. According to the present invention, these limiting circuits are now made voltage dependent, more particularly, dependent on the voltage in the network 2 of the inverter station, and this voltage can be derived in a number of different ways (as will now be described) so that both stations are simultaneously influenced by a possible voltage reduction in the network 2.

According to the invention, these methods may individually give the desired result, but as is usual in connection with important installations, it is often preferable to combine the different methods, thus achieving a doubled margin of safety.

The simplest arrangement is an attractive possibility in the case of the previously mentioned back-to-back connection, where the networks 1 and 2 came close to each other, so that the rectifier and inverter stations are built side-by-side. In this case the voltage in the network 2 is quite simply sensed by means of a voltage transformer 22, and a rectified output from the transformer 22 (after passing through a rectifier 24) is fed to a line 26 leading to the current limiting means 19, 20 of each station.

If the networks 1 and 2 are widely separated, so that the line 7, 8 represents a long DC transmission line of, perhaps, several hundred or thousand kilometers in length, the same principle can be employed, but in this case the line 26 to the rectifier station must define a very fast telecommunication link, so that the current limitation can take place practically simultaneously in both stations. It has been estimated that the line 26 should have a capacity of 2000–2500 baud to provide a sufficiently fast signal transmission. While doubts may arise as to providing such a telecommunication link solely for the purpose of the invention, such a link may often be required for other purposes. Possibly such a telecommunication link already exists and can easily be made available for the purpose described.

It is a simple matter to obtain in the inverter station a representation of the voltage in the network 2. Even if a sufficiently fast telecommunication link to the rectifier station is not available, it is still possible to sense, in the rectifier station, that a voltage drop has occurred in the AC network at the inverter station. This can be done by comparing the voltage on the DC line 7, 8 with the voltage in the AC network 1 of the rectifier station. If the voltage on the line 7, 8 is lower than the voltage in the network 1, it can safely be concluded that it is the mains voltage of the inverter that has dropped. Thus, the voltage of the rectifier AC network 1 is sensed by a voltage transformer 21, rectified in a rectifier 23 and compared with the direct voltage from the voltage divider 9 in a summator 25. The output of the summator 25 will then give an indication of what is happening to the voltage of the inverter AC network. In a level detector 27 the voltage difference between these two voltages is indicated. When it is discovered that the voltage between the lines 7, 8 is lower than the voltage of the network 1, it can be assumed that the voltage of the AC network 2 has dropped, and a signal can then be supplied to the current limiting means 19. This mode of operation can often result in response times comparable to those obtainable with a telecommunication link 26. If possible, however, it may be desirable to use both of the above-mentioned systems. By comparing the voltage on the line 7, 8 with that in the network 1, a reduction of the DC voltage on the line 7, 8 due to a voltage reduction in the network 1 does not trigger a control function.

Possibly, the voltage sensing can take place in the same way in both stations, i.e. by comparison of the voltage of the AC network with that of the DC line, as described above. The current order limitation in the two stations is then performed according to the following conditions:

In the rectifier station a current order limitation takes place if the DC line voltage drops without any significant change in the AC voltage.

In the inverter station the current orders are limited if both the DC line and the AC network voltages drop.

It will be noted that these two conditions coincide when the AC network voltage of the inverter station drops.

If, on the other hand, the AC voltage of the rectifier station drops, this means that the DC voltage of the line will drop while the AC voltage of the inverter station remains substantially unchanged, i.e. the opposite to the above conditions.

Whilst a preferred embodiment of control system has been described in detail, various modifications, alterations and changes may be made thereto without departing from the spirit and scope of the present invention as defined in the appended claims.

What is claimed is:

1. A DC power transmission system comprising
    a rectifier station,
    an inverter station,
    an AC network for each station,
    a DC line connecting said stations together,
    control means for the system comprising a current control circuit for the transmission system which delivers a common current order to a current regulator for each station, and
    a circuit in one of said stations for setting a current margin between the said two stations,
    characterized in that
    the control means comprises a device for sensing the voltage in the AC network of the inverter station and that
    a current limiting circuit is provided in each said station for simultaneous limitation of the current order in both said stations in dependence on a reduction of the voltage in the AC network of the inverter station.

2. A DC power transmission system according to claim 1, in which the rectifier and inverter stations are arranged in a common station for asynchronous interconnection of two adjacent AC networks,
    characterized in that the voltage-sensing device senses the voltage directly in the AC network of the inverter and supplies a signal to the two current limiting circuits.

3. A DC power transmission system according to claim 1, characterized in that the voltage sensing device senses the voltage directly in the AC network of the inverter station and that the measured result is transmitted via a telecommunication link to the current limiting circuit of the rectifier station.

4. A DC power transmission system according to claim 1, characterized in that the voltage sensing device is divided into a first part which senses the voltage in the AC network of the inverter station and influences the current limiting circuit in the inverter station, and a second part which influences the voltage limiting circuit in the rectifier station and which compares the voltage of the DC line with the voltage in the AC network of the rectifier station, whereby a reduction of the DC line voltage in relation to the AC voltage of the rectifier station is interpreted as a reduction of the AC voltage of the inverter.

5. A DC power transmission system according to claim 4, characterized in that the voltage of the DC line is compared with the voltage of the AC network at the inverter station.

6. A DC power transmission system according to claim 3, characterized in that the voltage sensing device is divided into a first part which measures the voltage in the AC network of the inverter station and influences the current limiting circuit in the inverter station, and a second part which influences the voltage limiting circuit in the rectifier station and which compares the voltage of the DC line with the voltage in the AC network of the rectifier station, whereby a reduction of the DC line voltage in relation to the AC voltage of the rectifier station is interpreted as a reduction of the AC voltage of the inverter.

* * * * *